June 11, 1957  I. I. SIKORSKY  2,795,284
TAIL ROTOR COUNTERWEIGHT
Filed Feb. 19, 1954  3 Sheets-Sheet 1

INVENTOR
I. I. SIKORSKY
BY M. B. Tasker
ATTORNEY

June 11, 1957 — I. I. SIKORSKY — 2,795,284
TAIL ROTOR COUNTERWEIGHT
Filed Feb. 19, 1954 — 3 Sheets-Sheet 2

INVENTOR
I. I. SIKORSKY
BY M. B. Tasker
ATTORNEY

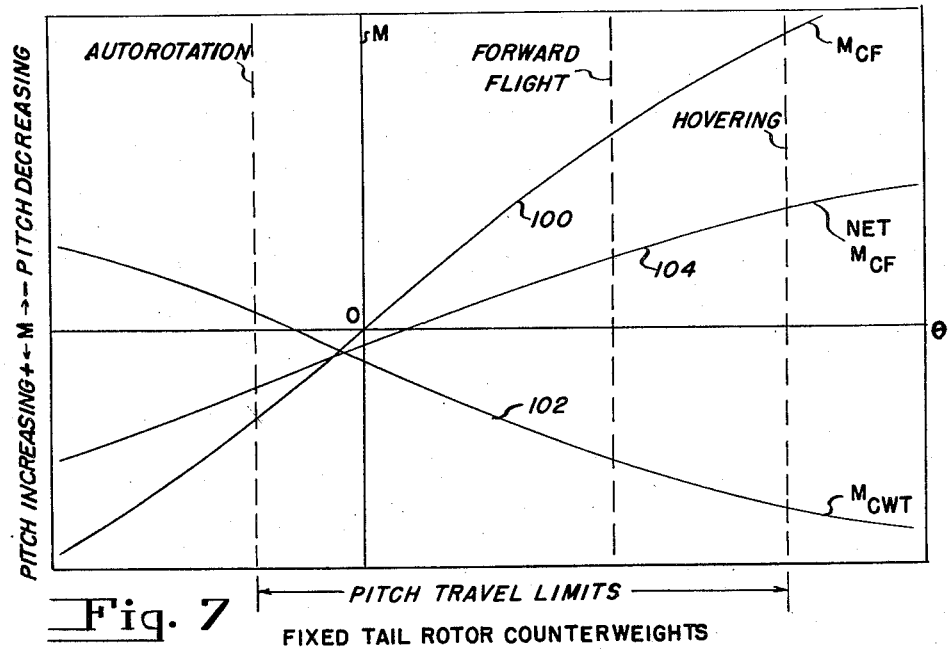
Fig. 7 — FIXED TAIL ROTOR COUNTERWEIGHTS
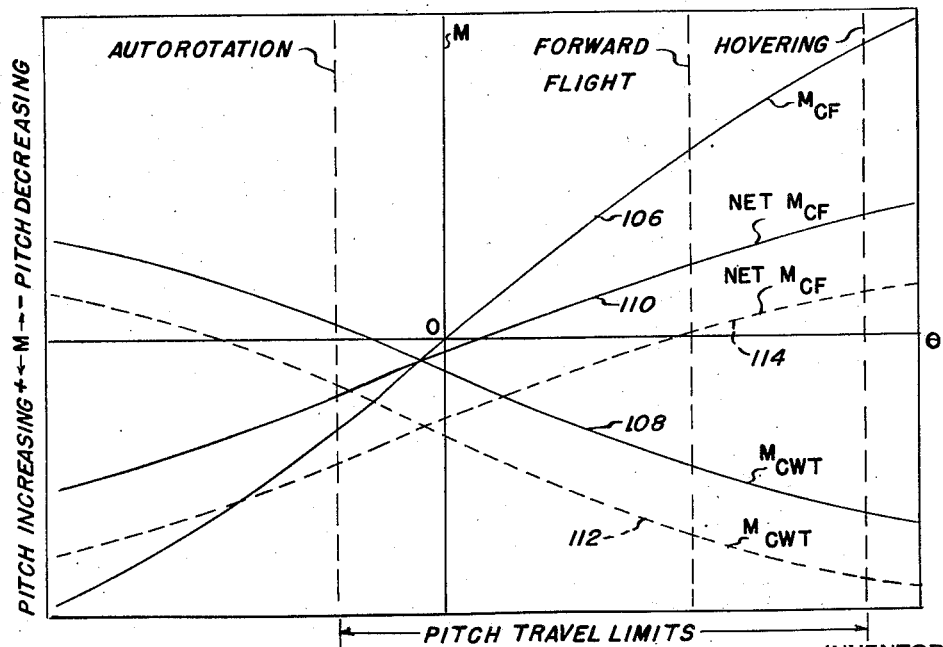
Fig. 8 — ADJUSTABLE BEAM COUNTERWEIGHTS

United States Patent Office 2,795,284
Patented June 11, 1957

2,795,284

TAIL ROTOR COUNTERWEIGHT

Igor I. Sikorsky, Easton, Conn., assignor to United Aircraft Corporation, East Hartford, Conn., a corporation of Delaware Application February 19, 1954, Serial No. 411,375

9 Claims. (Cl. 170—160.16)

This invention relates to helicopter rotors and particularly to tail rotors used to counteract the torque developed in driving a main sustaining rotor.

In a tail rotor of this type, the blades when rotating constantly tend to move to zero pitch due to centrifugal forces acting on the blades. These forces are transmitted into the pilot's control pedals and must be increasingly resisted by the pilot as the pitch of the tail rotor blades is increased or the speed of rotation of the tail rotor increases.

An object of this invention is to provide improved means for counteracting these forces in the tail rotor pitch control system so as to prevent excessive forces in the system during hovering and autorotation while retaining a desirable amount of feel in the pilot's controls.

A further object of the invention is to provide improved means for counteracting the pitch decreasing moments in the rotating blades without adding mass to the blades.

A still further object of the invention is to provide controllable pitch increasing moments which vary automatically as a result of the pilot's pedal adjustment of tail rotor pitch for counteracting the natural pitch decreasing moments of the blades.

A further object of the invention is to provide an improved system of counterweights for tail rotors.

A still further object of the invention is generally to improve the construction and operation of helicopter tail rotors and the controls therefor.

These and other objects and advantages of the invention will be evident from the following detailed description of a preferred embodiment of the invention shown in the accompanying drawings or will be pointed out hereinafter.

In these drawings:

Fig. 7 is a graph illustrating the blade centrifugal moment curve and the counterweight moment curve of a tail rotor prior to this invention having the counterweights mounted rigidly on the blade shanks; and Fig. 8 is a similar graph of the improved tail rotor illustrating the net centrifugal force moment curve which may be obtained as a result of this invention.

Figure 1:
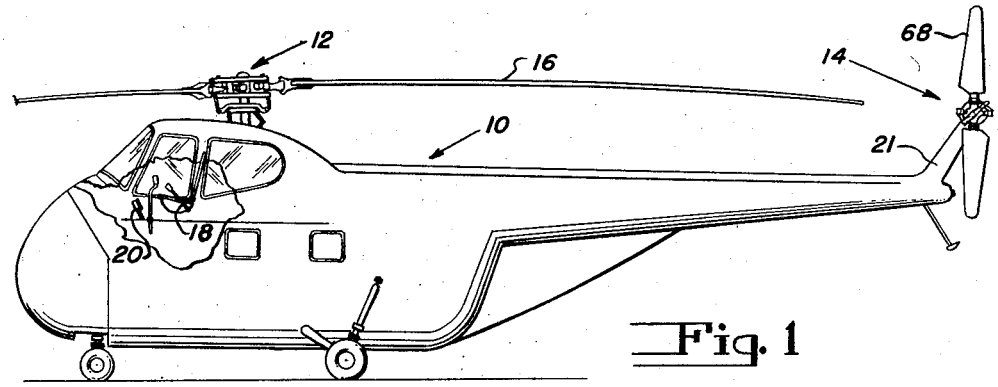
Fig. 1 shows a helicopter in side elevation having a tail rotor constructed in accordance with this invention.
Figure 4:
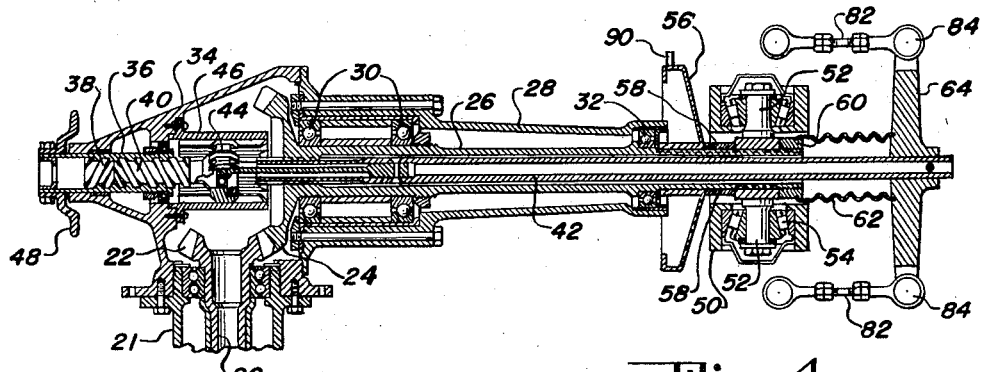
Fig. 4 is a sectional view of the tail rotor driving and supporting structure taken on line 4—4 of Fig. 3.

Fig. 1 shows a helicopter 10 of conventional configuration having a single main sustaining rotor 12 and a torque counteracting tail rotor 14. An engine, not shown, drives the main rotor 12 through a centrifugal overrunning clutch. The pitch of the blades 16 on the main rotor may be varied collectively and cyclically by means of controls 18 and 20 in a well-known manner. The tail rotor 14 is driven by shafting 20 (Fig. 4) which extends aft through the tail cone and tail rotor pylon 21 and is connected to the main rotor drive shaft so that the main and tail rotors are always mechanically interconnected and will rotate together both in powered flight and in autorotation.

The shafting 20 carries a bevel gear 22 which meshes with a bevel gear 24 on one end of a tubular tail rotor drive shaft 26 that is supported in a housing 28 on bearings 30 and 32. Bevel gears 22 and 24 are enclosed in a housing 34 which connects housing 28 and pylon 21. Rotatively mounted in the housing 34 is a sleeve 36 having a spirally threaded passage 38 which receives a similarly threaded member 40 on one end of a reciprocable tubular rod 42 which extends through the drive shaft 26 and projects therefrom. Member 40 is prevented from rotating relative to drive shaft 26 by a splined enlargement 44 which is received in a splined sleeve 46 fixed to housing 34. A sprocket 48 is fixed to the projecting end of sleeve 36 which is driven by a chain controlled by the pilot's pedals in a usual manner. Rotation of the sprocket 48 in one direction or the other by the differential operation of the pilot's pedals results in reciprocation of the pitch control rod 42 relative to the tail rotor hub 50 which is mounted at the outboard end of the drive shaft 26.

Figure 3:
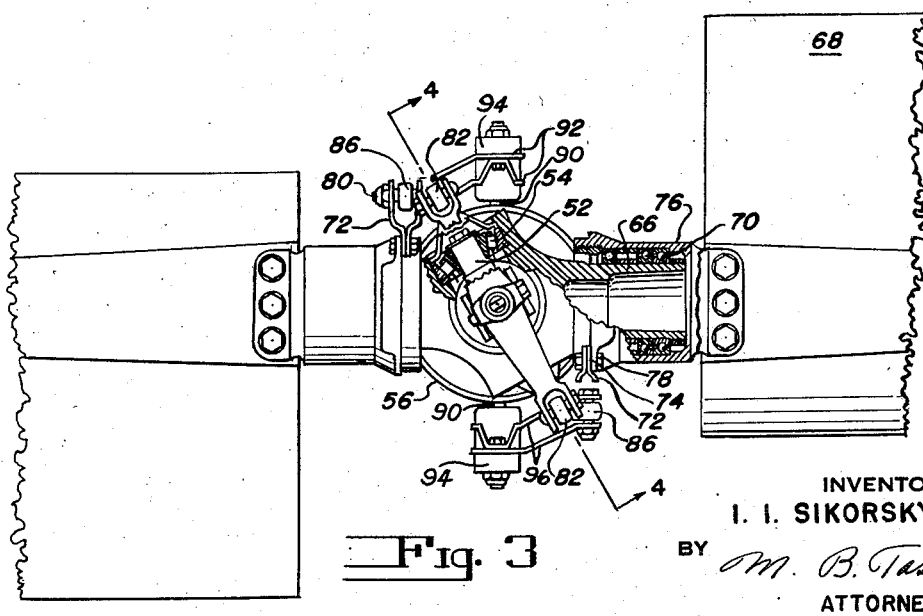
Fig. 3 is a front view of the tail rotor with parts broken away.

The hub is mounted on trunnion 52, splined to the drive shaft 26, by means of bearings 54 which form a flapping hinge having an axis 4—4 (Fig. 3) oblique with respect to the longitudinal axis of the blades. A stop member or flange 56 is also splined to the drive shaft 26 and with a spacer sleeve 58 (Fig. 4) occupies the space between the bearing 32 at the outboard end of housing 28 and the hub of trunnion 52. A nut 60 on the threaded extremity of drive shaft 26 secures the stop 56, spacer 58 and trunnion 52 in position on the drive shaft. A flexible boot 62 is connected at one end to the nut 60 and at its other end to the hub of pitch changing beam 64 and forms an enclosure for the end of drive shaft 26.

Hub 50 has two diametrically opposed axle arms 66 formed integral therewith on which the tail rotor blades 68 are journalled on bearings 70 for pitch changing movement about their longitudinal axes. Since the tail rotor shown is two-bladed and the controls for each blade are identical with the other, the description will be confined to one blade.

Figure 2:
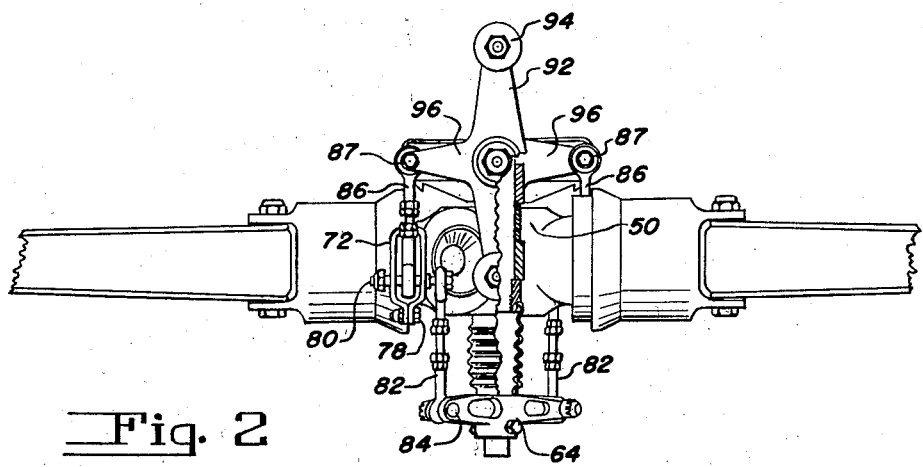
Fig. 2 is a plan view with parts broken away.

Each blade has a horn 72 which is secured to a flange 74 (Fig. 5) on the blade cuff 76 by two bolts 78. The extremity of the horn 72 carries a long bolt 80 (Fig. 2), one end of which is connected to a link 82, adjustable as to length, which is connected at its other end to one end of the pitch changing beam 64 by a pivot 84. It will be noted that the blade horn 72 is formed of two connected plates which diverge at their extremities where the long bolt 80 is located. Between the spaced plates of horn 72 one end of an adjustable link 86 is pivoted on bolt 80, the other end of which is connected by a pivot 87 to a pivoted counterweight device with which this invention is particularly concerned.

Figure 6:
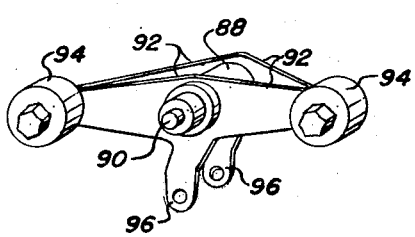
Fig. 6 is a perspective detail of one of the counterweight units.

The counterweight unit for each blade, as shown in detail in Fig. 6, comprises a beam assembly having a hub 88 pivotally mounted on a stud 90 carried by the stop member 56, the studs 90 being located as shown herein on diametrically opposite sides of the drive shaft 26 and at right angles thereto, although one advantage of the present invention is the freedom of choice in the location of the counterweights. Hub 88 has pairs of spaced sheet metal arms 92 which converge at their outer end and are welded together and to the hub 88 to form a beam support for weights 94 located at the extremities of the arms and symmetrically disposed about the pivot 90. Arms 92 also have integral control arms 96 which are offset at their extremities into position to be directly connected with the ends of links 86, previously described, by pivot bolts 87.

It will thus be evident that the link 86 which swings the counterweights about pivot 90 is connected by bolt 80 to the pitch control linkage so that when the beam 64 is moved by the pilot's controls to vary the pitch of the blade, it also swings the counterweight assembly about its pivot 90. In the illustrative installation the arrangement of the parts is such that when the pitch of the blades 58 is zero, the counterweight arms 92 lie approximately in the plane including the axis of rotation of the drive shaft 26, although this position may be varied somewhat by adjusting the length of links 86 for a purpose which will hereinafter be explained in connection with Figs. 7 and 8.

Considering the operation of the counterweights, it will be evident that with the counterweight beams 92 in the position which they occupy at zero blade pitch, in which they lie in the plane including the axis of shaft 26, rotation of the tail rotor assembly about the axis of shaft 26 will produce no movement of the beams 92 about their own pivots 90. The beams 92 and weights 94 are unstable in this position but are prevented from moving about pivots 90 by their connection, including links 86 and 82, to the blade pitch changing beam 64.

Figure 5:
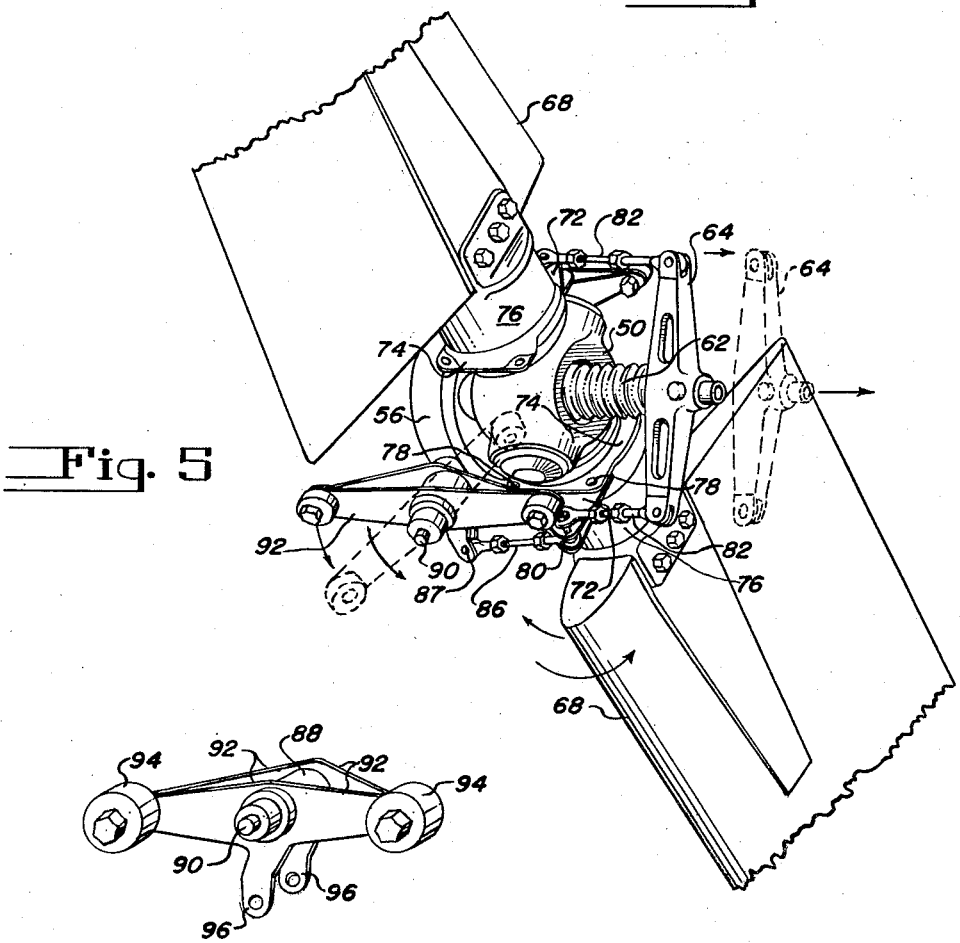
Fig. 5 is a perspective view of the improved tail rotor.

If the pitch of the blades is increased, however, weights 94 will be moved clockwise by the pitch linkage about their pivots 90, as viewed in Fig. 5, out of the plane including the axis of shaft 26. The rotating weights now tend to move about their pivots 90, due to centrifugal force, into a position in which the beams are at right angles to shaft 26, although they never move into this extreme position due to restraint imposed by the linkage connecting them to the blade pitch control mechanism. In an advanced pitch setting of the blades the beams occupy some intermediate position such as the dotted position shown in Fig. 5 in which centrifugal force acting on the weights 94 constantly tends to move them about their pivots 90 in a direction to oppose the natural tendency of the rotating blades to return to zero pitch (propeller moment). Thus, it will be seen that as the pitch of the blades in increased and the propeller moment tending to return the blades to zero pitch increases the counterweights produce a force increasingly opposing the propeller moments. By varying the effective length of links 86 the opposing forces can be made to substantially neutralize each other so that no force is transmitted back to the pilot's pedals, or only a small force which may be desired for pilot's feel.

Also the angle through which the counterweight beam 92 is moved relative to the angular movement of the blades about their feathering axis may be varied by making the blade horns 72 and the arms 96 of suitable lengths, thus enabling a flexibility of design impossible with the prior constructions wherein the counterweights were attached directly to the blade parts.

This will be evident from a comparison of the charts of Figs. 7 and 8. In Fig. 7 the pitching moment curve due to centrifugal forces acting on the blades has been shown by curve 100 for various flight conditions from autorotation where a small pitch increasing moment (negative blade pitch) occurs to hovering where a large pitch decreasing moment occurs, this latter being the condition of maximum positive blade pitch. Curve 102 shows the counterweight moment curve for a counterweight installation in which weights are fixed to the blades and move with the blades as the latter move about their pitch changing axes.

The algebraic sum of the two curves produces the resultant curve 104. Curve 104 shows a decrease in the total pitching moment acting on the blades. By increasing the amount of weight at the root end of the blade it is possible to still further flatten the slope of the net moment curve 104. However from a practical standpoint, the weight requirement becomes prohibitively high to mount on the blades. Furthermore as the weight is located at the root of the blade outboard of its flapping hinge it would produce an additional bending moment on the root of the blade and thereby limits the fatigue life of the blade.

Fig. 8 shows a similar chart for the adjustable beam counterweights of this invention. Curve 106 corresponds to curve 100 in Fig. 7 while curve 108 corresponds to curve 102 of Fig. 7. However, in this case the counterweight is not mounted on the root of the blade. Rather it is mounted on a flange carried by the tail rotor drive shaft and therefore does not add weight to the blade assembly which is mounted for flapping around axis 4—4.

By reason of this new mounting of the counterweight it is possible to adjust the angular relationship of the counterweight beam with respect to the pitch angle of the blades. In this manner the counterweight moment curve 108 is shifted in phase with respect to the blade centrifugal moment curve 106 to a new position 112 and thereby shifts the resultant moment curve 114 of the blades. This shift reduces the forces on the blade pitch control system to near zero in the normal forward flight condition. It also reduces the force to a very low value in the hovering condition. Some disadvantage is incurred in the autorotation condition but since the original pitching moments there are relatively small this slight increase is not inconvenient for the pilot under normal autorotative conditions which represent only a very small percentage of flight time.

As a result of this new counterweight mounting it is possible to reduce the loads felt by the pilot in the controls and to adjust them in such a manner that in normal flight condition they are substantially eliminated thereby reducing pilot fatigue on long flights, while still retaining a desirable amount of "feel" in the controls when the helicopter is operated at other than the normal cruising condition.

Although one preferred embodiment is shown herein it will be obvious that if the aircraft is to be hovered for long periods of time, such as in anti-submarine detection operations, the control forces can readily be adjusted to be zero in the hovering conditions.

I claim:

1. In a helicopter rotor, a drive shaft, a hub driven by said shaft, a blade mounted on said hub for pitch varying movement about its longitudinal axis, pilot operable means, means operably connecting said pilot operable means to said blade for controlling the pitch of said blade, counterweight means rotatable with said drive shaft including a weight supporting arm, said weight supporting arm being pivotally mounted for movement on an axis which intersects the axis of said shaft, said weight supporting arm being located in a plane passing through said drive shaft when said blade is at zero pitch, and means operably connecting said pilot operable means with said counterweight means for controlling pivotal movement of said weight supporting arm.

2. In a helicopter rotor, a drive shaft, a hub driven by said shaft, a blade mounted on said hub for pitch varying movement about its longitudinal axis, pilot operable means, means operably connecting said pilot operable means to said blade for controlling the pitch of said blade, counterweight means rotatable with said drive shaft including a weight supporting arm, said weight supporting arm being pivotally mounted at a point intermediate its ends on an axis which intersects the axis of said shaft, said arm having a weight on each end, said weight supporting arm being located in a plane passing through said drive shaft when said blade is at zero pitch, and means operably connecting said pilot operable means with said counterweight means for controlling pivotal movement of said weight supporting arm.

3. In a helicopter rotor, a drive shaft, a hub driven by said shaft, a blade mounted on said hub for pitch varying movement about its longitudinal axis, pilot operable means, means operably connecting said pilot operable means to said blade for controlling the pitch of said blade, counterweight means rotatable with said drive shaft including a weight supporting arm, said weight supporting arm being pivotally mounted for movement on an axis which intersects the axis of said shaft and forms an angle of 90° therewith, said weight supporting arm being located in a plane passing through said drive shaft when said blade is at zero pitch, and means operably connecting said pilot operable means with said counterweight means for controlling pivotal movement of said weight supporting arm.

4. In a helicopter rotor, a drive shaft, a hub driven by said shaft and pivoted thereon on an axis transverse to said shaft, a blade mounted on said hub for pitch varying movement about its longitudinal axis and also for movement about the transverse axis of said hub, pilot operable means, means operably connecting said pilot operable means to said blade for controlling the pitch of said blade, counterweight means rotatable with said drive shaft including a weight supporting arm, said weight supporting arm being pivotally mounted for movement about an axis generally transverse to the axis of said shaft, said weight supporting arm being mounted for movement independently of said pivoted hub, and means operably connecting said pilot operable means with said counterweight means for controlling pivotal movement of said weight supporting arm.

5. In a helicopter rotor, a drive shaft, a hub driven by said shaft and pivoted thereon on an axis transverse to said shaft, a blade mounted on said hub for pitch varying movement about its longitudinal axis and also for movement about the transverse axis of said hub, pilot operable means, means operably connecting said pilot operable means to said blade for controlling the pitch of said blade, counterweight means rotatable with said drive shaft including a weight supporting arm, said weight supporting arm being pivotally mounted for movement about an axis which intersects the axis of said shaft, said weight supporting arm being mounted for movement independently of said pivoted hub, said weight supporting arm being located in a plane passing through said drive shaft when said blade is at zero pitch, and means operably connecting said pilot operable means with said counterweight means for controlling pivotal movement of said weight supporting arm.

6. In a helicopter rotor, rotatable means including a drive shaft with a flange and a rotor hub thereon, blades pivotally mounted on said hub for pitch varying movement, said rotor hub being pivoted on said shaft for rotation at various angles to the axis of said shaft, pilot operable means connected with said blades for varying the pitch thereof, means for producing a pitch changing moment opposite to the natural pitch changing moment of said rotating blades including a weight supporting arm for each blade pivotally mounted on said rotatable means, a weight on each arm, means for pivotally mounting said weight supporting arm for movement on said flange independently of said pivoted hub, each weight supporting arm having an axis through its pivotal mounting intersecting said drive shaft, and means operatively connecting said arms with said pilot operable means for adjusting said weight relative to the axis of said drive shaft as the pitch of said blades is varied from a position producing no moment to a position producing a maximum moment.

7. In a helicopter rotor, rotatable means including a drive shaft having an axis with a flange and a rotor hub thereon, blades pivotally mounted on said hub for pitch varying movement, pilot operable means connected with said blades for varying the pitch thereof, means for producing a pitch changing moment opposite to the natural pitch changing moment of said rotating blades including a weight supporting arm for each blade pivotally mounted on said flange, each weight supporting arm having an axis through its pivotal mount intersecting the axis of said drive shaft, a weight on each arm, and means operatively connecting said arms with said pilot operable means for adjusting said weights relative to the axis of said drive shaft as the pitch of said blades is varied, each weight being movable from one side of a plane passing through the axis of said drive shaft and the axis of its supporting arm to the other.

8. In a helicopter rotor, rotatable means including a drive shaft and a rotor hub thereon, blades pivotally mounted on said hub for pitch varying movement, pilot operable means connected with said blades for varying the pitch thereof, means for producing a pitch changing moment opposite to the natural pitch changing moment of said rotating blades including a weight supporting arm for each blade pivotally mounted on said rotatable means, a weight on each arm, each of said weight supporting arms being located in a plane passing through said drive shaft when its blade is at zero pitch changing moment due to centrifugal force, and means operatively connecting said arms with said pilot operable means for adjusting said weight relative to the axis of said drive shaft as the pitch of said blades is varied.

9. In a helicopter rotor, rotatable means including a drive shaft and a rotor hub thereon, blades pivotally mounted on said hub for pitch varying movement, pilot operable means connected with said blades for varying the pitch thereof, means for producing a pitch changing moment opposite to the natural pitch changing moment of said rotating blades including a weight supporting arm for each blade pivotally mounted on said rotatable means, each weight supporting arm being mounted for pivotal movement about an axis which intersects the axis of said shaft, a weight on each arm, and means operatively connecting said arms with said pilot operable means for adjusting said weight relative to the axis of said drive shaft as the pitch of said blades is varied.

References Cited in the file of this patent

UNITED STATES PATENTS

| Number | Name | Date |
|---|---|---|
| Re. 18,957 | Gobereau et al. | Sept. 26, 1933 |
| 1,952,799 | Havill | Mar. 27, 1934 |
| 2,219,303 | Fraser | Oct. 29, 1940 |
| 2,419,893 | Hackethal | Apr. 29, 1947 |
| 2,426,130 | Wald | Aug. 19, 1947 |
| 2,480,871 | McCoy | Sept. 6, 1949 |
| 2,499,314 | Hunt | Feb. 28, 1950 |
| 2,614,637 | Landgraf | Oct. 21, 1952 |